United States Patent [19]

van der Lely et al.

[11] Patent Number: 4,497,446
[45] Date of Patent: Feb. 5, 1985

[54] SPREADER

[75] Inventors: Ary van der Lely, Maasland; Cornelis J. Gerardus Bom, Rozenburg, both of Netherlands

[73] Assignee: C. Van der Lely N.V., Maasland, Netherlands

[21] Appl. No.: 409,024

[22] Filed: Aug. 18, 1982

[30] Foreign Application Priority Data

Aug. 21, 1981 [NL] Netherlands ............ 8103896

[51] Int. Cl.³ .............................................. A01C 17/00
[52] U.S. Cl. ..................... 239/661; 239/687
[58] Field of Search ............... 239/650, 661, 681, 682, 239/683, 687

[56] References Cited

U.S. PATENT DOCUMENTS

| | | | |
|---|---|---|---|
| 1,166,477 | 1/1916 | Parrish | 239/665 |
| 3,038,643 | 6/1962 | van der Lely et al. | 239/683 |
| 3,218,083 | 11/1965 | van der Lely | 239/687 |
| 3,537,649 | 11/1970 | van der Lely | 239/666 |
| 4,205,793 | 6/1980 | van der Lely | 239/682 |

FOREIGN PATENT DOCUMENTS

| | | | |
|---|---|---|---|
| 2046551 | 3/1972 | Fed. Rep. of Germany . | |
| 1513824 | 1/1968 | France | 239/681 |
| 1532897 | 6/1968 | France . | |
| 1554428 | 12/1968 | France . | |
| 6918881 | 6/1970 | Netherlands . | |
| 683299 | 11/1952 | United Kingdom | 239/681 |

Primary Examiner—Andres Kashnikow
Attorney, Agent, or Firm—Penrose Lucas Albright

[57] ABSTRACT

A spreader comprises a hopper having two delivery parts. At the bottom of each delivery part there is a delivery member having an outwardly and upwardly inclined wall in which are which outlet ports. The bottom of the delivery member is closed by a distribution member. The inclined position of the wall of the delivery member in which the outlet ports are provided enables high rates of flow of material from the hopper to be achieved.

23 Claims, 10 Drawing Figures

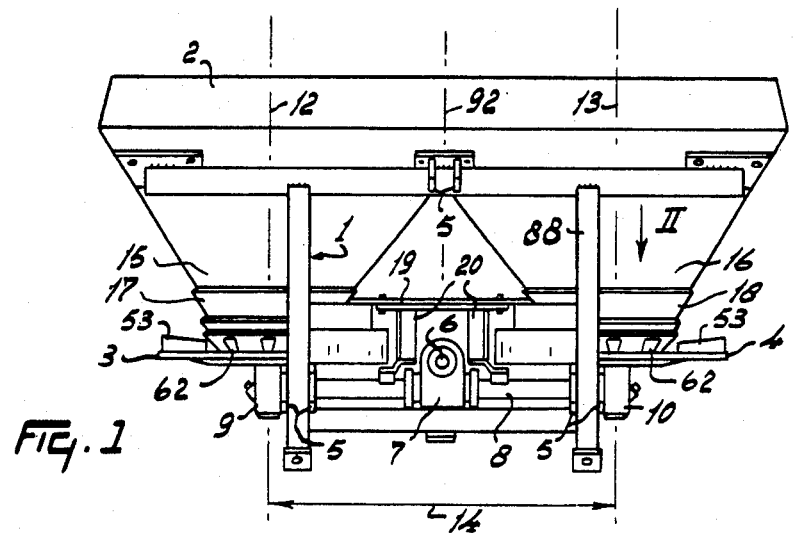
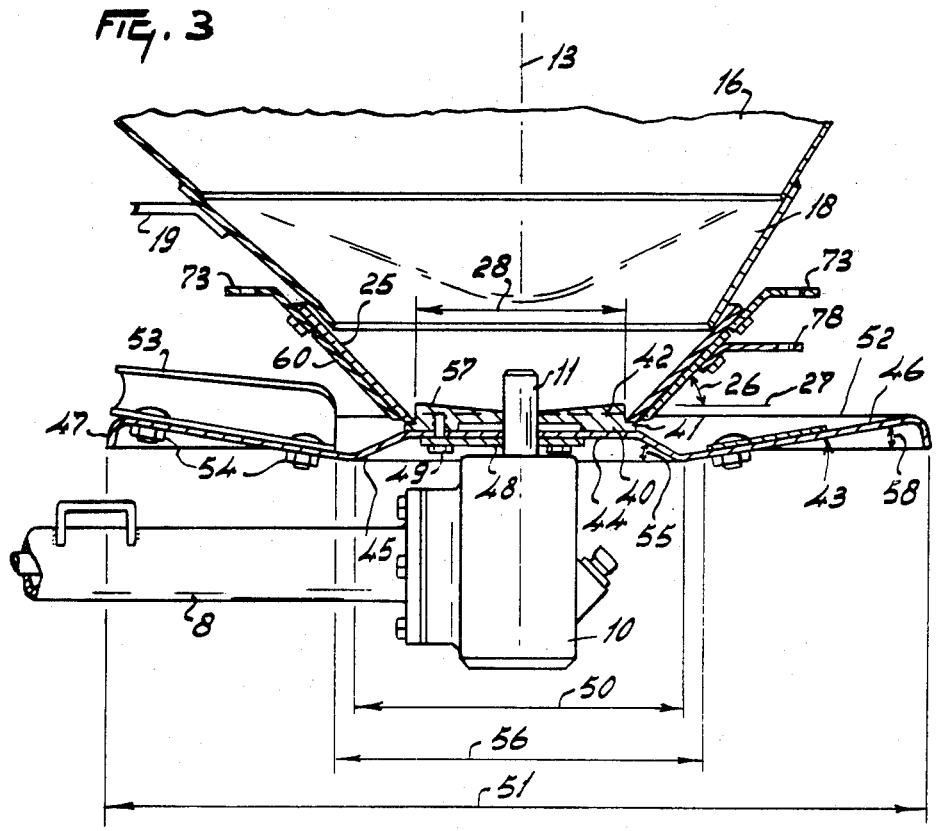

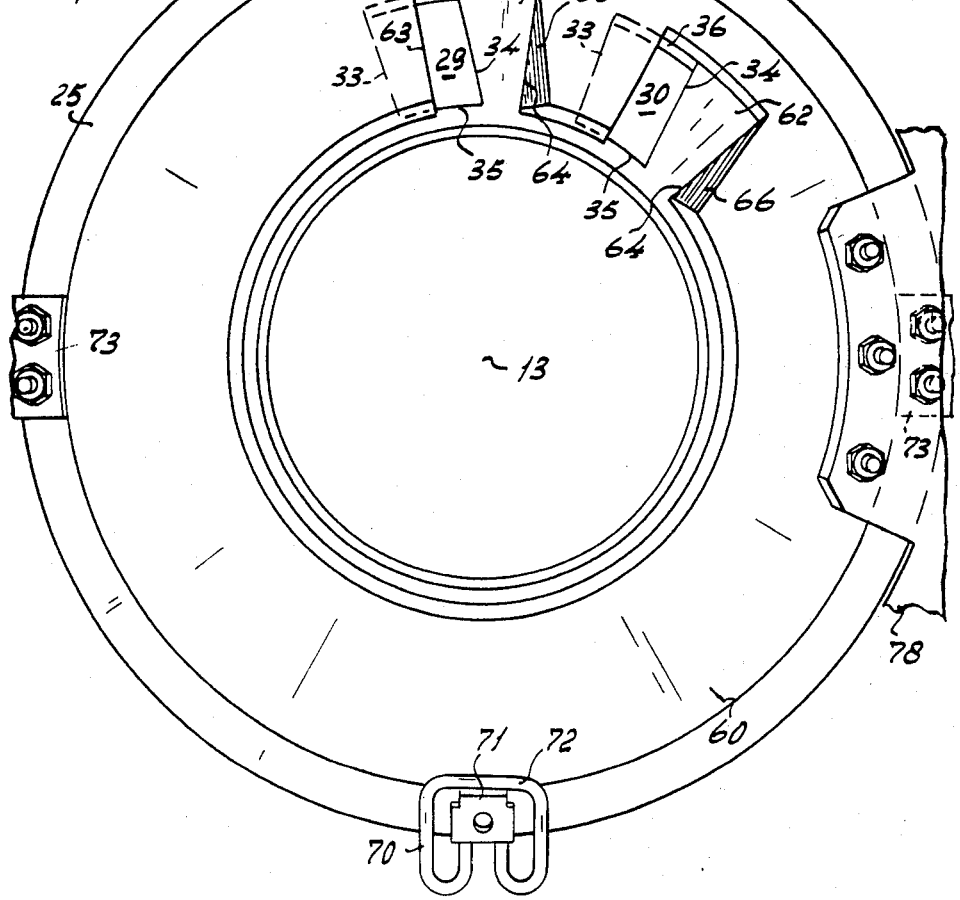

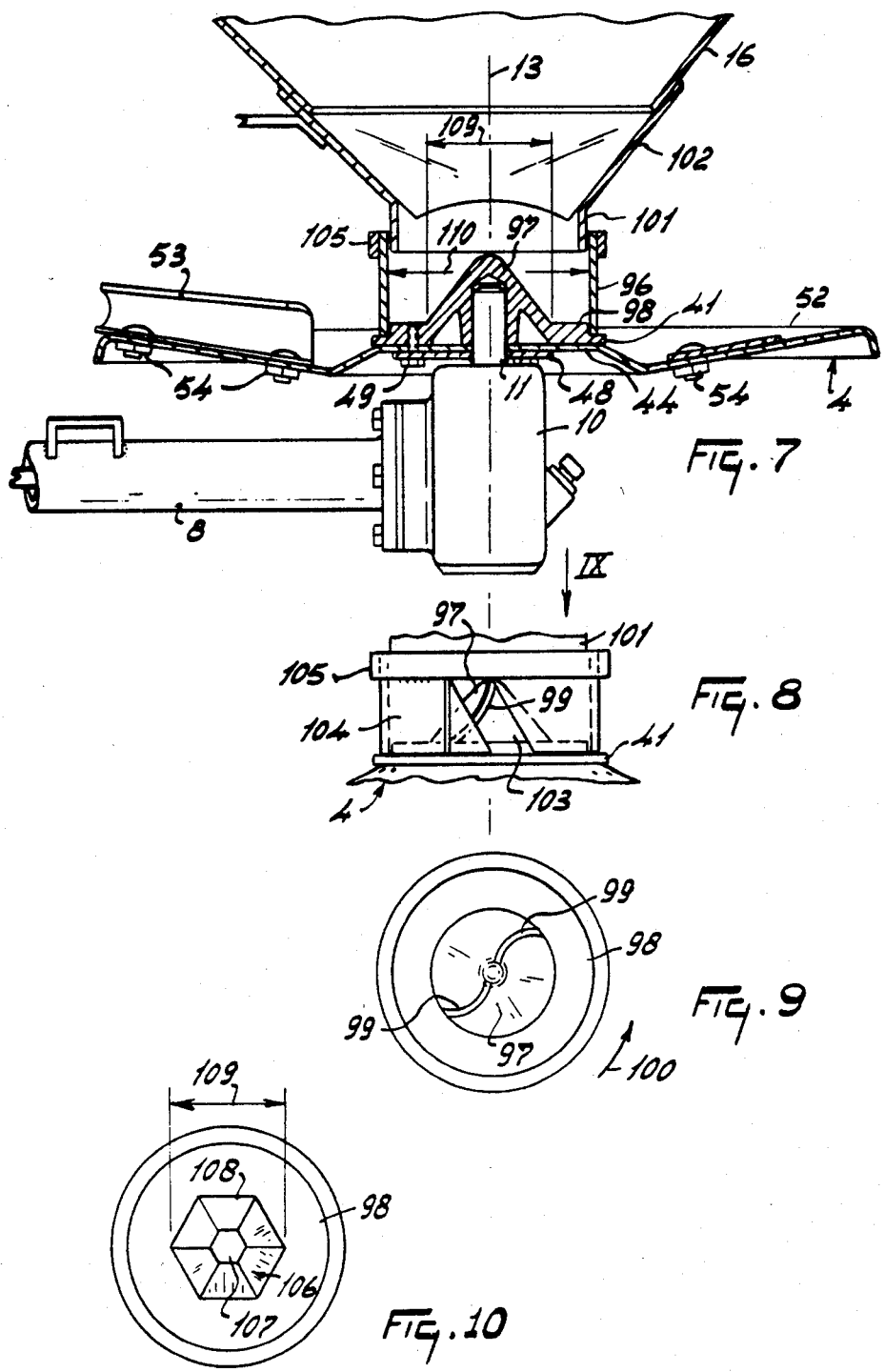

SPREADER

SUMMARY OF THE INVENTION

This invention relates to a spreader for spreading granular or powdery material or both.

According to the present invention a spreader is provided for spreading granular or powdery material or both, comprising a container having an outlet port, a distribution member mounted for rotation about an upwardly extending rotary axis, the distribution member forming at least partly a floor of the container and the outlet port being provided in a wall portion of the container at least near one side of the container adjacent the distribution member characterized in that the wall portion having the outlet port is at an angle of 90° or less to the horizontal when the spreader is on level ground.

With a construction in accordance with the present invention a large amount of material can be fed per unit time to the distribution member so that the spreader can be very successfully employed for spreading material over a large width during travel of the spreader.

An advantageous embodiment of the spreader according to the invention is obtained when the wall portion constitutes a delivery member of the hopper adjoining the distribution member and widening in the direction away from the distribution member. A satisfactory junction of the wall portion with the distribution member can be obtained when the delivery part is movable with respect to the rest of the hopper.

According to a further aspect of the invention, there is arranged with the circumference of the delivery member a guide member extending upwards from the part of the distribution member forming the floor of the hopper and tapering upwardly. In this construction the guide member will guide the material flowing from the hopper towards the outlet port so that the rate of flow of the material through the outlet port can be high and large amounts of material per unit time can be fed from the hopper to the distribution member.

For a better understanding of the present invention and to show how it may be carried into effect, reference will now be made, by way of example, to the accompanying drawings, in which:

BRIEF DESCRIPTION OF THE DRAWINGS

FIG. 1 is a front view of a spreader;

FIG. 3 is a vertical sectional view taken on the line III—III in FIG. 2;

FIG. 4 is an elevational view of part of the spreader taken in the direction of the arrow IV in FIG. 2;

FIG. 5 is a bottom view of parts of the device taken in the direction of arrow V in FIG. 4;

FIG. 7 is a vertical sectional view corresponding to FIG. 3 but showing an alternative construction for part of the spreader;

FIG. 8 is an elevational view of part of the spreader of FIG. 7;

FIG. 9 is a plan view in the direction of the arrow IX in FIG. 8; and

FIG. 10 is a plan view corresponding to FIG. 9 but showing an alternative construction.

DESCRIPTION OF THE PREFERRED EMBODIMENTS

Figure 2:
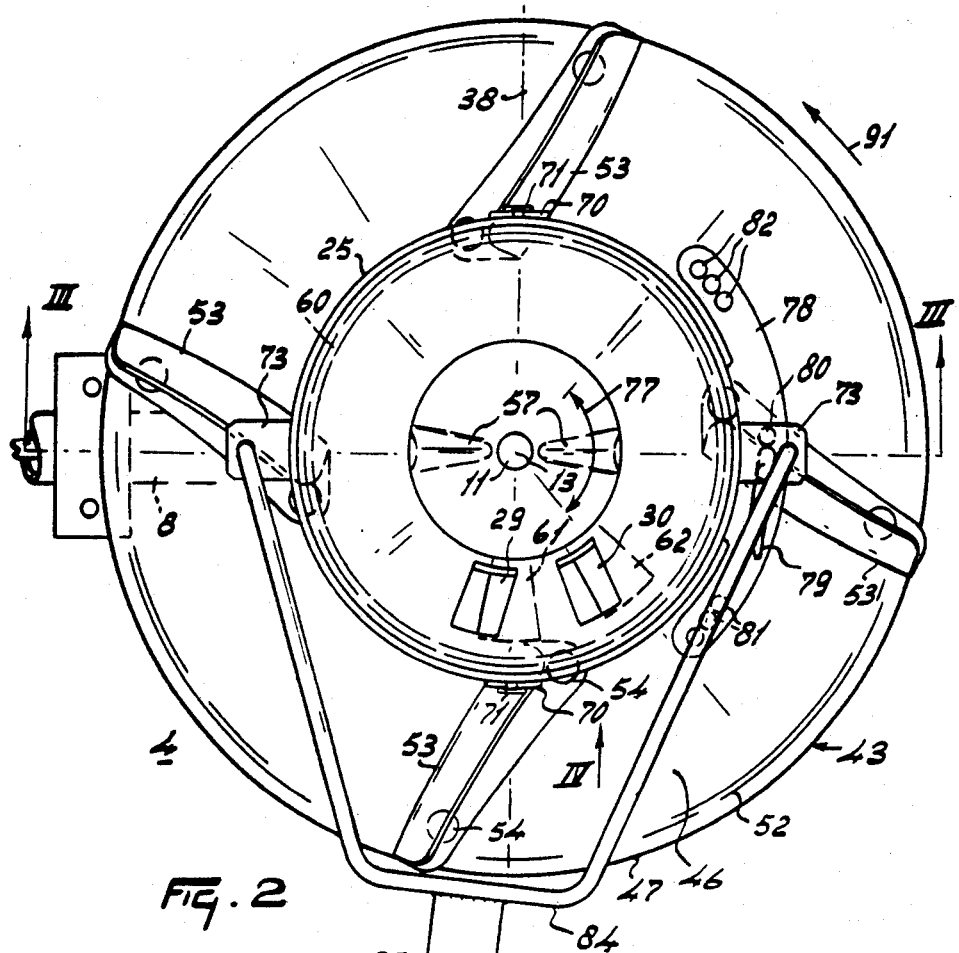
FIG. 2 is an enlarged plan view of part of the spreader taken in the direction of the arrow II in FIG. 1.
Figure 6:
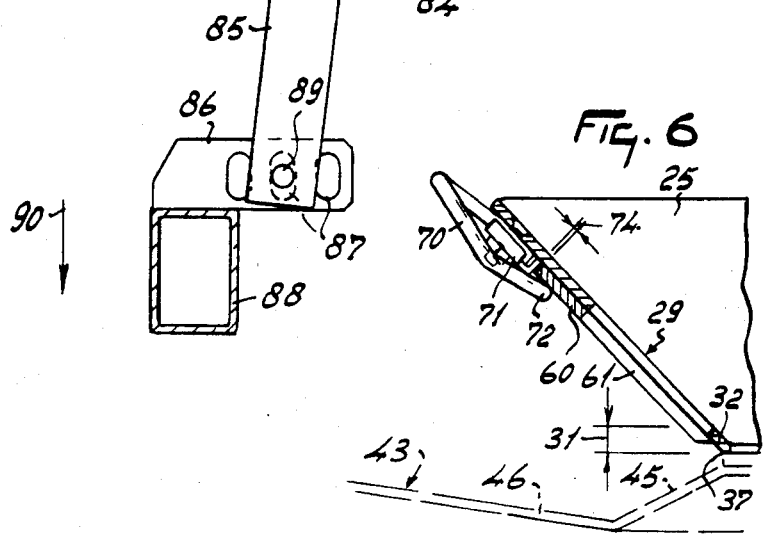
FIG. 6 is a vertical sectional view taken on the line VI—VI in FIG. 4.

The spreader shown in FIGS. 1 to 6 comprises a frame 1, which is provided with a hopper 2 and distribution members 3 and 4. The frame 1 has fastening members 5 for hitching the spreader to the three-point lifting device of a tractor or a similar vehicle. There is drive means for the distribution members 3 and 4 which comprises a connecting shaft 6, which can be coupled with the power take-off shaft of the supporting tractor. The connecting shaft 6 is journalled in a gear box 7 having gears engaging a transmission shaft in a hollow beam 8. At each end of the hollow beam 8 there is a gear box 9 or 10, in which are journalled shafts to which the distribution members 3 and 4 are fastened. One of these shafts, designated 11, is shown in FIG. 3 with the distribution member 4 fastened to it. The distribution members 3 and 4 are rotatable by the transmission members in the gear boxes about parallel rotary axes 12 and 13 which extend upwardly and are spaced apart by a distance 14 in the transverse direction of the machine. The distribution members 3 and 4 are arranged beneath delivery spouts 15 and 16 of the hopper 2. The delivery spouts 15 and 16 have lower ends 17 and 18 respectively, which are interconnected by a tie member 19 which, in turn, is fastened by carrying strips 20 to hollow beam 8 and thereby to distribution members 3 and 4.

Each of the delivery spouts 15 and 16, as is shown in detail for the delivery spout 16, has a delivery member 25 on the underside. The delivery member 25 constitutes a wall portion of the hopper, which is inclined by an angle 26 to the horizontal plane 27 when the spreader is on level ground. The angle 26 is smaller than 90° and preferably not greater than 80° and not less than about 30°. In the illustrated embodiment the angle 26 is about 45°. The inclined wall portion has two outlet ports 29 and 30, which are provided at the front of the delivery member with respect to the normal operative travel direction of 90 of the spreader. The ports 29 and 30 are located near the plane 38 containing the axis 13 and extending in the direction 90. In the illustrated embodiment the wall portion 25 is a conical ring the axis of which coincides with the rotary axis 13 of the distribution member 4. The delivery member 25 is constructed so that it flares upwardly from where it meets the distribution member 4. Near the ports 29 and 30 the wall portion has a lower rim 32 (FIG. 6) having a height 31 of a few millimeters. Viewed on plan, the outlet ports 29 and 30 each have an edge 33 extending radially with respect to the rotary axis 13. The quadrangular outlet ports 29 and 30 have an edge 34 disposed opposite the edge 33; the edge 34 does not extend radially with respect to the rotary axis 13, but is substantially parallel to the radial edge 33. The lower edge 35 and the upper edge 36 of the outlet ports extend parallel to the lower edge 37 of the delivery part 25.

The delivery part 25 bears on the supporting plate 40 of the distribution member 4 located beneath the delivery part. The supporting plate 40 has a protruding supporting rim 41 and a raised central part 42. The edge 37 bears on the upper surface of the supporting rim 41 which extends at right angles to axis 13. The lower end of the delivery part 25, having an inner diameter 28, is centered on the central part 42. The central part 42 has two small ridges 57. Relative to a vertical position of the rotary axis 13, the supporting rim 51 and the edge 37 are horizontal.

The supporting plate 40 is located on a raised central part 44 of a part 43 of the distribution member 4. The central part 44 is parallel to a plane perpendicular to the rotary axis 13. The diameter of the part 44 is equal to the diameter of the supporting plate 40, which slightly exceeds the inner diameter 28 of the lower side of the delivery member 25. At its periphery, the central part 44 meets a downwardly conically flaring part 45, the axis of which coincides with the axis 13. The part 45 terminates in an upwardly inclined port 46, which is also conical and has an axis which coincides with the rotary axis 13. The plate 43 has at its circumference a downwardly bent outer rim 47.

The central part 44 is secured by bolts 49 to a fastening plate 48 rigidly secured to the shaft 11. The bolts 49 also secure the supporting plate 40 to the central part 44.

The diameter 50 of the lower edge of the conical part 45 is such that the outlet ports 29 and 30 are located above it. The part 45 is inclined by an angle 55 of about 30° to the horizontal. The outer edge 52 of the conical part 46 lies in a horizontal plane at right angles to the axis 13 approximately at the level of the lower edges 35 of the ports 29 and 30. The conical part 46 slopes upwardly from the inside to the outside at an angle 58 of about 10°. In the illustrated embodiment, four curved ejection blades 53 are fastened to the part 46 by bolts 54. The outer ends of the ejection blades 53 are located approximately at the outer circumference 51 of the distribution member 4. The inner ends of the ejection blades 53 are located on an imaginary circle 56 within which lie the outlet ports 29 and 30 (FIG. 2).

A closing member 60 extends around the delivery member 25. The closing member 60 has a plurality of recesses corresponding with the number of outlet ports in the delivery member 25. Thus, in the illustrated embodiment the closing member has two recesses 61 and 62. Viewed on plan, each of the recesses 61 and 62 have edges 63 and 64 which extend radially with respect to the rotary axis 13. The recesses are open on the underside of the closing member 60 but have an upper edge 65 located at the level of the upper edges 36 of the outlet ports 29 and 30. Like the delivery member 25, the closing member 60 is conical and its axis coincides with the rotary axis 13 in a manner such that the closing member 60 smoothly engages the outer surface of the delivery member 25. Each outlet recess 61 and 62 has near its edge 64 a bevelled part 66 so that the edges 64 become thinner towards the lower end and at the lower end they have only a small wall thickness as is shown in particular in FIG. 5.

The closing member 60 is supported by diametrically opposed clamping springs 70 arranged on the delivery member 25. Each clamping spring is rigidly secured by means of a fastening block 71 to the delivery member 25 and is provided with a clamping rim 72, which is slightly curved so that it is in direct contact with the outer surface of the closing member 60. In positions off-set by 90° with respect to the fixing blocks 71 there are two diametrically opposite tags 73 provided on the outer side of the delivery member 25. The fixing blocks 71 and the tags 73 are arranged near the top edge of the closing member 60 in a manner such that in the correct position of the closing member 60 on the delivery member 25 the top edge of the closing member 60 is spaced apart by a small clearance 74 from the underside of the blocks 71 and the tags 73. The clearance is about one to two millimeters.

The closing member 25 is provided with an adjusting member 78 subtending an angle 77 of about 100° around the rotary axis 13. The adjusting member 78 has three groups each having three holes 80, 81 and 82. The adjusting member 78 is connected with an adjusting rod 79, which can be inserted at will into one of the holes 80, 81 or 82. The adjusting rod 79 is coupled with an adjusting mechanism (not shown in detail) for adjusting and retaining the closing member to and in the desired position respectively with respect to the delivery member 25.

The delivery member 25 is connected by the tags 73 with a bracket 84 having an adjusting arm 85. The adjusting arm 85 carries a pin 89, which can be inserted at will into any one of three elongate holes 87 in a strip 86, which is rigidly secured to a frame beam 88 of the frame 1.

To use the spreader, it is hitched by the fastening members 5 to the three-point lifting device of a tractor, and the shaft 6 is linked to the power take-off shaft. The material to be spread is loaded into the hopper 2 and during operation it can be fed through the ports 29 and 30 and through the recesses 61 and 62 to the distribution members 3 and 4. The distribution members 3 and 4 are driven in a manner such that their regions of closest approach move forwardly with respect to the direction 90, the member 4 thus rotating in the direction of the arrow 91 (FIG. 2). With respect to the direction 90, the ports 29 and 30 are located to the front of the machine. The feed of material to the distribution members and the rotation of the distribution members are such that each of the distributing members 3 and 4 spreads the material generally centrally behind the machine so that the spreading sectors of the two distribution members coincide, i.e. the distribution members spread the material over the same strip of land during travel of the spreader.

The rate of flow of material through the outlet ports depends on the quantity to be spread per unit of surface, on the spreading width, and on the speed of travel of the spreader. The rate of flow of material to each of the distribution members can be adjusted by closing the outlet ports 29 and 30 to a greater or lesser extent. This is done by turning the closing member 60 with respect to the delivery member 25 so that the recesses 61 and 62 coincide to a greater or lesser extent with the outlet ports 29 and 30. The closing member 60 can be displaced with respect to the delivery member 25 by means of the adjusting rod 79, which can be actuated by the tractor driver by means of a control-mechanism (not shown). In particular, when a large quantity of material has to be spread per unit of surface and the material is spread over a broad strip at a relatively high travel speed, the flow rate of material has to be relatively higher. In order to enable a delivery of a large quantity of material per unit time through the outlet ports, the outlet ports are arranged in wall portions of the hopper which are inclined to the horizontal when the spreader is on level ground, the angle 26 being smaller than 90°. As a result the material can leave the hopper through the outlet ports in a natural stream directed more or less downwardly. The outflow of material through the ports 29 and 30 can be particularly enhanced by the rotating distribution member forming, in addition, the floor of the hopper. Thus the material located inside the delivery member 25 and bearing on the supporting plate 40 of the distribution member 4 will be subjected to an outwardly directed force. The ridges 57 will favorably affect the movement of the material adjacent the floor of the hopper. Therefore, by the natural downward stream and the centrifugal force produced by the rotating floor formed by the supporting plate 40 the material will readily flow through the outlet ports. With regard thereto it is important for the wall portion having the outlet ports to be at an angle 26 to the horizontal plane which is smaller than 80°. The inclined wall 25 and the rotating floor 40 thus ensure complete emptying of the hopper.

The material flowing out of the outlet ports 29 and 30 reaches the conical surface 45 located beneath the outlet ports so that it is slightly guided in a direction towards the periphery of the distribution member. Owing to the rotation of the distribution member the material will flow from the conical part 45 to the rising supporting surface 46 and be engaged by the ejection blades 53 to be spread with the desired force. In order to ensure adequate capture and entry of the material at the inner ends of the ejection blades, these inner ends are located on a circle having a diameter 56 exceeding the diameter of the circle within which the outlet ports 29 and 30 are located. It is thus ensured that the material flowing out of the ports is fed to the inner ends of the ejection blades. In order to maintain the distribution member and the inner ends of the blades at the correct distance from the delivery member it is advantageous that the distribution member constitutes the floor of the hopper and that the angle 26 between the wall of the delivery member 25 and the horizontal plane is not smaller than about 25° to 30°. It is particularly advantageous for the angle 26 to be 45° as in the illustrated embodiment.

The construction embodying the invention, in which the delivery part 25 is conical or flares upwardly in a different manner and in which the delivery part has a rotating floor formed by the distribution member, enables a large amount of material per unit time to be advantageously delivered from the hopper, and so is particularly suitable for use in spreaders having distribution members capable of spreading the material over a large width. In principle, the idea of the invention can also be applied to spreaders having only one distribution member. The spreader in the illustrated embodiment, having two distribution members each spreading the material over the same strip so that the material is symmetrically spread with respect to the vertical plane 92 containing the longitudinal centerline of the spreader by each of the distribution members, is particularly suitable for spreading the material uniformly over a large width. The material can be spread, for example, over a width of twenty-five meters, while the distribution throughout said width remains satisfactorily uniform. Therefore, the machine shown is particularly suitable for use in the so-called "tramline system", in which the same track can be used for several runs across the field, in which case, however, each run must have the same working width.

The direction of spread of the material can be adjusted to some extent by adjusting the position of the ports 29 and 30 about the rotary axis 13. This adjustment can be performed by inserting the pin 89 into a different one of the holes 87. In accordance with this adjustment the rod 79 has to be inserted into a different hole 80 forming a connecting place in the adjusting member in a manner such that both the delivery member 25 and the closing member 60 are displaced through the same angle in order to maintain the recesses 61 and 62 in register with the outlet ports 29 and 30. This adjustment for slightly varying the angle of distribution may be important in travelling, for example, on an inclined field or in the event of windy weather. Moreover, this adjustability of the direction of distribution can be used for spreading different kinds of material.

If desired, one of the two outlet ports 29 or 30 may be shut so that the material is delivered through only one outlet port. This may be important when a relatively small quantity of material has to be spread per unit area. By closing one of the ports the direction of distribution can be slightly influenced to a greater or lesser extent by displacing the setting arm 85 along the strip 86. When one of the ports 29 or 30 has to be blocked, the rod 79 has to be inserted into one of the holes 81 or 82. Therefore the groups of holes 81 and 82 are turned with respect to the group of holes 80 through an angle about the rotary axis 13 equal to the angle between the ports 29 and 30. For this reason each group of holes 80, 81, 82 has a number of holes equal to the number of holes 87. The angle between the holes of each group 80, 81, 82 about the axis 13 is equal to the angle between the holes 87 about the axis 13. In order to facilitate the insertion of the pin 89 into the holes 87 the latter are elongate in the direction of the rotary shaft 13.

The stream of material through the outlet ports will be affected by the rotation of the distribution member 4 in a direction coinciding with the direction of rotation 91 of the distribution member. In order to avoid an adverse effect of the edges 64 of the recesses 61 and 62 on the material flowing out of the outlet ports 29 and 30, the edges 64 of the recesses have bevelled parts 66. Near the lower ends of the edges 64 of the edge is bevelled most, since the material flowing along said side is most affected by the rotating floor.

The location of the edge 34 of each port 29 and 30 substantially parallel to the side 33, and deviating from the radial position, has the advantage that, when the ports 29 and 30 are nearly shut, small passages are formed which have a generally triangular shape, bounded by the edges 63 and 34 and the lower side 35. By means of these triangular passages an adjustment can be obtained in which very small amounts per unit time can still flow in an advantageous manner through the passages out of the hopper.

In order to ensure satisfactory cooperation between the closing member 60 and the delivery member 25 in setting the magnitude of the passage of the ports 29 and 30 the closing member 60 should satisfactorily bear on the delivery member 25. For this purpose the clamping springs 70 are provided, the edges 72 of which urge the conical closing member 60 against the delivery member 25. A slanting position of the closing member 60 with respect to the delivery member 25 is avoided owing to the slight clearance 74 provided between the top edge of the closing member 60 and the clamping blocks 71 and the strips 83. In order to ensure that the closing member 60 is readily movable with respect to the delivery member 25, the closing member 60 is preferably made from a different material from the delivery member 25 so that these members cannot become rusted together. The closing member 60 is preferably made from rust-proof material, for example, rust-proof metal.

Since the delivery member 25 is supported by the supporting plate 40 and the supporting plate 40 serves as a floor for the delivery member 25, the supporting plate is likely to be exposed to wear. For this reason, the supporting plate 40 is manufactured separately from the plate 43 of the distribution member so that in the event of excessive wear the supporting plate can be readily replaced. The delivery member 25 bears on the supporting plate 40 in continuous manner because the ports 29 and 30 are closed on the lower side by the rims 32. The ejection blades 53 may also be exposed to heavier wear than the plate 43. For this purpose the ejection blades 53 are manufactured separately from the plate 43 and fastened thereto by means of bolts 54. Thus the ejection blades 53 can also be replaced by new ones.

Since the material can readily flow through the outlet ports 29 and 30 in the inclined wall 25, it is possible to use a comparatively small diameter 28 of the delivery member, for example, smaller than 200 millimeters. Preferably the diameter 28 does not exceed about 170 millimeters and an advantageous magnitude lies between 150 and 120 millimeters. This small diameter of the delivery member also permits the use of a small diameter 51 of the distribution member. The small diameter of the distribution member enables economical manufacture of the distribution member without using much material. Furthermore, owing to the small diameter of the distribution member its weight is low so that the forces exerted on the various components during the rotation of the distribution member can also be slight. It is thus, moreover, possible to rotate the distribution member at high speed. This high speed of rotation permits of ejecting the material over a large distance, while in addition the material will very readily flow through the distribution member, which is conducive to a uniform distribution. It will be obvious that the above statements with respect to the delivery member 25, the closing member 60 and the distribution member 14 also apply to the members corresponding to said components and arranged on the underside of the delivery spout 15 and above the distribution member 3.

FIGS. 7, 8 and 9 show a further embodiment of the delivery part by which the material can readily flow out of the hopper. The parts shown in these Figures corresponding with those of the first embodiment are designated by the same reference numerals. In this second embodiment a delivery part 96 is arranged near the lower end of the delivery spouts 15 and 16, as is shown for the delivery spout 16, the part 96 being cylindrical with its axis coincident with the rotary axis 13. Inside the delivery part 96 there is a member 97 which guides the material and has a diameter which decreases from bottom to top. The guide member 97 tapers upwardly from a supporting plate 98. In this embodiment the member 97 is conical its axis is coincident with the rotary axis 13. As is shown in the preceding embodiment for the supporting plate 40 the supporting plate 98 is fastened by bolts 49 to the central part 44 of the distribution member 4. In this embodiment the guide member 97 is integral with the supporting plate 98 and made from cast material. Inside the member 97 is left an opening for the shaft 11. The member 97 is provided with two diametrically opposed guide blades 99, which are slightly curved as is shown particularly in FIGS. 8 and 9. With respect to the direction of rotation 100 the curvature extends from top to bottom against the direction of rotation 100 in a manner such that the convex side of the curvature is directed to the front.

The top edge of the delivery member 96 surrounds the cylindrical lower end 101 of the part 102 of the delivery spout 16. In the embodiment of FIG. 7, the cylindrical delivery part 96 has one outlet port 103, but it may, as an alternative, have two or more outlet ports. As is apparent when viewed in a direction perpendicular to the axis of the cylindrical member 96 (FIG. 8), the outlet port 103 is inclined to that axis. The outlet port 103 is inclined forwardly from top to bottom, with respect to the direction of operative rotation of the distribution member 4, as indicated by an arrow 100. A closing member 104 extends around the delivery part 96 for closing the outlet port 103 to a greater or lesser extent for controlling the flow rate of material from the hopper through the port 103. The closing member 104 is connected with a ring 105 arranged around the delivery part 96.

Like the delivery member 25, the delivery part 96 bears on a supporting rim 41 and is centered on a raised part of the supporting plate. Like the delivery member 25 the delivery part 96 is held by an adjusting arm in the desired position about the rotary axis 13, but this arrangement is not shown in detail in FIGS. 7 to 9. The closing member 104 is held in the desired position relative to the delivery part 96 by means of an adjusting rod corresponding with the adjusting rod 79.

In the embodiment of FIGS. 7 to 9, material flowing down by physical action through the delivery spout 16 has to be deflected laterally from the downward direction of the stream through 90° in order to pass through the outlet port 103. The deflection of the downward stream can be readily performed by the guide member 97, the surface of which is inclined radially outwards from top to bottom. Owing to the rotation of the member 97 with the supporting plate 98 forming a bottom the material will be pushed towards the delivery member 96, while the blades 99 of the member 97 push the material in downward direction. Although in particular for the delivery of large quantities of material per unit time the disposition of the delivery member 25 is more suitable, a satisfactory delivery of material can nevertheless be obtained by means of the construction shown in FIGS. 7 to 9.

FIG. 10 shows a different construction of the guide member. This embodiment comprises a guide member 106 in the form of a truncated pyramid with a flat top surface 107 and flat sides 108. The illustrated embodiment has six sides 108, but this number may be chosen at will. As in the preceding embodiment, the width 109 of the guide member 97 and 106 respectively is larger than half the diameter 110 of the delivery part 96.

Although various features of the spreaders described and illustrated in the drawings are in the following claims as inventive features, the invention is not necessarily limited to these features and is intended to encompasses all novel and distinctive features disclosed both individually and in various combinations.

Having described our invention, what we claim as new to be secured by Letters Patent of the United States is:

1. A spreader for spreading granular or powdery material or both, comprising a container delivery member having an outlet port, a distribution member mounted for rotation about an upwardly extending rotary axis, said distribution member forming at least partly a floor of said container delivery member and providing support for said container delivery member, said outlet port being provided in a wall portion of said container delivery member near a lower side thereof adjacent said distribution member, said wall portion having said outlet port being disposed at an angle less than 90° relative to said distribution member and to the horizontal when the spreader is on level ground, said distribution member having a downwardly conically flaring part located beneath said outlet port to receive a flow of said material therefrom.

2. A spreader as claimed in claim 1 which comprises a hopper having two spaced like said container delivery members, each such delivery member having a corresponding said wall portion with a corresponding said outlet port, said wall portions each adjoining a respective corresponding said distribution member, said distribution members cooperating in operation to spread material over coincident sectors.

3. A spreader as claimed in claim 1, characterized in that said wall portion is inclined to the horizontal by an angle which is not greater than 80° and not less than 30°.

4. A spreader as claimed in claim 3 characterized in that said outlet port is located in the front region of said container delivery member with respect to the intended direction of operative travel of the spreader.

5. A spreader as claimed in claim 3, characterized in that said container delivery member adjoins said distribution member, a closing member for said outlet port surrounding said delivery member, said closing member having a recess which becomes wider in the direction away from said distribution member.

6. A spreader as claimed in claim 5, characterized in that said outlet port is located substantially entirely on one side of said delivery member.

7. A spreader as claimed in claim 5, characterized in that said delivery member bears on said distribution member.

8. A spreader as claimed in claim 7, characterized in that said delivery member bears on a supporting rim releasably fastened to said distribution member.

9. A spreader as claimed in claim 7, characterized in that said delivery member is located over a centering part.

10. A spreader as claimed in claim 9, characterized in that said delivery member is displaceable with respect to said container.

11. A spreader as claimed in claim 10, characterized in that said delivery member is an upwardly diverging annular member and is adjustable about said rotary axis of said distribution member.

12. A spreader as claimed in claim 11, characterized in that said closing member is provided adjacent said wall portion having the outlet port, said closing member being adjustable and fixable in any one of a plurality of positions with respect to said wall portion for selectively closing said outlet port to a greater or lesser extent.

13. A spreader as claimed in claim 12, characterized in that said closing member has a plurality of recesses corresponding with the number of said outlet ports with the sides of said recesses diverging upwardly and in that each said outlet port and its said respective recess have sides which are relatively non-parallel and are so constructed and arranged that partial closure of each said outlet port by its respective closing member defines a substantially triangular passage.

14. A spreader as claimed in claim 12, characterized in that said delivery member is provided with at least one stop which is located, when said closing member is correctly in engagement with said delivery member with a slight clearance above said closing member in a manner such that said stop ensures said closing member is retained in its correct location around said delivery member.

15. A spreader as claimed in claim 12, characterized in that at least one said outlet port is bounded at its lower periphery by a lower rim which comprises part of said delivery member.

16. A spreader as claimed in claim 12 wherein said distribution member comprises ejection blades, characterized in that, as viewed in a direction parallel to said rotary axis of said distribution member, each said outlet port is located within an imaginary circle on which are located the radially inner ends of said ejection blades.

17. A spreader as claimed in claim 16, characterized in that said ejection blades are releasably fastened with the aid of fastening means to a plate which comprises said distribution member.

18. A spreader for spreading granular or powdery material or both comprising a hopper for containing the material, a rotatable distribution member under said hopper arranged to receive material therefrom by gravity, said rotatable distribution member having a central part in its central area and ejection means for ejecting the material at its periphery and an intermediate part between said central part and said ejection means, an annular member interposed between said rotatable distribution member and said hopper, said annular delivery member having a lower edge, said central part engaging said lower edge and supporting said annular delivery member, said annular delivery member having walls which diverge upwardly relative to said distribution member's axis of rotation and extend over said intermediate part, outlet ports in said walls positioned directly over said intermediate part, and members for selectively closing said outlet ports.

19. A spreader as claimed in claim 18 wherein said intermediate part coincides with the surface of a truncated cone which converges in an upward direction.

20. A spreader as claimed in claim 19 wherein said annular delivery member diverges upwardly at an angle of about 45° and said truncated cone converges upwardly at an angle of about 30° relative to the horizontal.

21. A spreader as claimed in claim 19 wherein said ejection means comprises an outer conical part and ejection blades secured thereto outwardly from and closely proximate to said outlet ports as seen in plan, said conical part diverging upwardly at about 10° relative to the horizontal.

22. A spreader as claimed in claim 18 wherein said central part defines a groove at its periphery, said delivery member's lower edge received in said groove.

23. A spreader as claimed in claim 22 wherein said groove is defined by an outer upstanding circular edge of said central part and a lower circular supporting rim extending outwardly beyond said edge.

* * * * *